United States Patent
Iijima et al.

(10) Patent No.: US 11,215,472 B2
(45) Date of Patent: Jan. 4, 2022

(54) INFORMATION PROVIDING DEVICE AND IN-VEHICLE DEVICE

(71) Applicant: TOYOTA JIDOSHA KABUSHIKI KAISHA, Toyota (JP)

(72) Inventors: Akira Iijima, Nagoya (JP); Hironobu Sugimoto, Nagoya (JP); Hiroaki Sakakibara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 15/929,151

(22) Filed: Oct. 3, 2019

(65) Prior Publication Data

US 2020/0166368 A1 May 28, 2020

(30) Foreign Application Priority Data

Nov. 26, 2018 (JP) .............................. JP2018-220153

(51) Int. Cl.
  *G01C 21/36* (2006.01)
  *G01C 21/34* (2006.01)
  *G05D 1/02* (2020.01)
(52) U.S. Cl.
  CPC ..... *G01C 21/3629* (2013.01); *G01C 21/3415* (2013.01); *G05D 1/0221* (2013.01)
(58) Field of Classification Search
  CPC ............ G01C 21/3415; G01C 21/3629; G05D 1/0221
  See application file for complete search history.

(56) References Cited

U.S. PATENT DOCUMENTS

| | | | |
|---|---|---|---|
| 2005/0159945 A1* | 7/2005 | Otsuka ................... | G10L 15/20 704/226 |
| 2014/0074483 A1* | 3/2014 | van Os ................... | G06F 3/167 704/275 |
| 2017/0064445 A1* | 3/2017 | Pierfelice ................ | H04R 3/04 |
| 2017/0103571 A1* | 4/2017 | Beaurepaire ....... | G01C 21/3667 |
| 2018/0181365 A1* | 6/2018 | Winton ............... | G06F 3/04845 |
| 2018/0239349 A1* | 8/2018 | Rasmussen ........ | B60H 1/00735 |
| 2018/0283891 A1* | 10/2018 | Andrew ............ | G01C 21/3629 |
| 2019/0072398 A1* | 3/2019 | Balakrishna ....... | G01C 21/3492 |

FOREIGN PATENT DOCUMENTS

| | | |
|---|---|---|
| JP | 2017-45377 A | 3/2017 |
| JP | 2018-72207 A | 5/2018 |
| JP | 2018-142219 A | 9/2018 |

* cited by examiner

*Primary Examiner* — Behrang Badii
*Assistant Examiner* — Daniel L Greene
(74) *Attorney, Agent, or Firm* — Oblon, McClelland, Maier & Neustadt, L.L.P.

(57) ABSTRACT

An information providing device to be mounted on a vehicle. The vehicle includes control means and control means for transmitting, when the vehicle is controlled by automatic driving, a control signal for outputting route guidance information for informing a driver of the vehicle about a specified route by mechanical speech, and a control signal for outputting automatic driving guidance information for informing the driver of the vehicle about a route of the vehicle driven by automatic driving by a sound effect.

7 Claims, 5 Drawing Sheets

INFORMATION PROVIDING DEVICE AND IN-VEHICLE DEVICE

INCORPORATION BY REFERENCE

The disclosure of Japanese Patent Application No. 2018-220153 filed on Nov. 26, 2018 including the specification, drawings and abstract is incorporated herein by reference in its entirety.

BACKGROUND

1. Technical Field

The present disclosure relates to an information providing device and an in-vehicle device.

2. Description of Related Art

In recent years, there are cases where a vehicle receives or generates various pieces of information that may have to be provided to a driver or a passenger.

Japanese Patent Application Publication No. 2017-45377 discloses an in-vehicle device including a speech arbitration unit. The in-vehicle device acquires electronic toll collection (ETC) information from an ETC roadside machine and vehicle information communication system (VICS) (registered trademark) information from an information technology system (ITS) spot roadside machine, generates speech information, and provides the information to a driver. When speech timings of the speech information based on the ETC information and the speech information based on the VICS information are overlapped, the speech arbitration unit arbitrates output timings based on priority.

Japanese Patent Application Publication No. 2018-142219 discloses an in-vehicle device that notifies a driver or the like about current situation information indicating that a vehicle travels toward a destination, in addition to route guidance information based on a general navigation function, in the field of automatic driving.

SUMMARY

However, when the timing of voice guidance based on a navigation function is overlapped with the timing of voice guidance based on an automatic driving function, and the output timings are arbitrated based on priority, voice guidance of similar contents (for example, voice guidance "turn right" based on the navigation function, and voice guidance "get ready to turn right" based on the automatic driving function) may consecutively be output. This may annoy the driver or the like.

Since both the voice guidance contents may not completely coincide with each other, they may also confuse the driver or the like. For example, when a branch is ahead of the vehicle, and voice guidance "advance in X direction ahead" is output based on the navigation function at approximately the same time when voice guidance "a branch ahead" is output based on the automatic driving function, the driver needs to confirm that the branch is in the X direction. Similarly, when the vehicle temporarily changes a lane to a right lane, and then to a left lane before entering a left branch road, the navigation function may provide the guidance to prompt the vehicle to enter into the left branch road, while the automatic driving device may provide the guidance for a lane change to the right lane. Output of such seemingly contradictory guidance information may undesirably mislead the driver or the like.

Accordingly, it is an object of the present disclosure to provide an information providing device and an in-vehicle device, capable of providing guidance information for informing a route of a vehicle based on automatic driving and guidance information for informing a specified route, in an auditorily distinguishable manner without arbitration of output timings.

An information providing device according to one aspect of the present disclosure is mounted on a vehicle. The information providing device includes a controller for outputting, when the vehicle is controlled by automatic driving, a control signal for outputting route guidance information for informing a driver of the vehicle about a specified route by mechanized speech, and a control signal for outputting automatic driving guidance information for informing the driver of the vehicle about a route of the vehicle driven by automatic driving by a sound effect.

When the specified route is different from the route of the vehicle driven by the automatic driving, the controller may be configured to output the control signal for outputting the sound effect. The controller may further be configured to output a control signal for displaying a text or the like.

The case where the specified route is different from the route of the vehicle driven by automatic driving includes a case where the vehicle travels, by automatic driving, on a route not included in the specified route due to a lane change or the like.

The vehicle may include a first speaker and a second speaker for outputting the sound effect. The controller may be configured to output a control signal for outputting a first sound effect from the first speaker at first timing, and outputting a second sound effect from the second speaker at second timing. In the case where the first speaker is installed on a right side in a travel direction, and a second speaker is installed on a left side in the travel direction in particular, the controller may be configured to, when the vehicle moves rightward by automatic driving, output the control signal so as to output the first sound effect from the first speaker, and output the second sound effect different from the first sound effect from the second speaker, or inhibit output of any sound effect. The controller may also be configured to, when the vehicle moves leftward by automatic driving, output a control signal so as to output a third sound effect from the second speaker, and output a fourth sound effect different from the third sound effect from the first speaker, or inhibit output of any sound effect.

An in-vehicle device according to one aspect of the present disclosure includes a car navigation device. The car navigation device includes an input unit for inputting a place of departure and a destination, a search unit for a route from the input place of departure to the destination, and a first controller for generating, based on the route and a current location, a control signal for outputting route guidance information for informing a driver of a vehicle about a route to travel. The in-vehicle device further includes an automatic driving device. The automatic driving device includes a second controller for generating a control signal for automatically driving the vehicle and a control signal for outputting automatic driving guidance information for informing the driver of the vehicle about a route where the vehicle travels by the automatic driving. When the vehicle is driven automatically by the automatic driving device, the first controller generates a control signal for outputting the route guidance information by mechanized speech, and the second controller generates a control signal for outputting the automatic driving guidance information by the sound effect.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of the present disclosure will be described hereinbelow with reference to the drawings. The following embodiments are only illustrative for explanation of the present disclosure and are not intended to limit the present disclosure to the embodiments.

Figure 1:
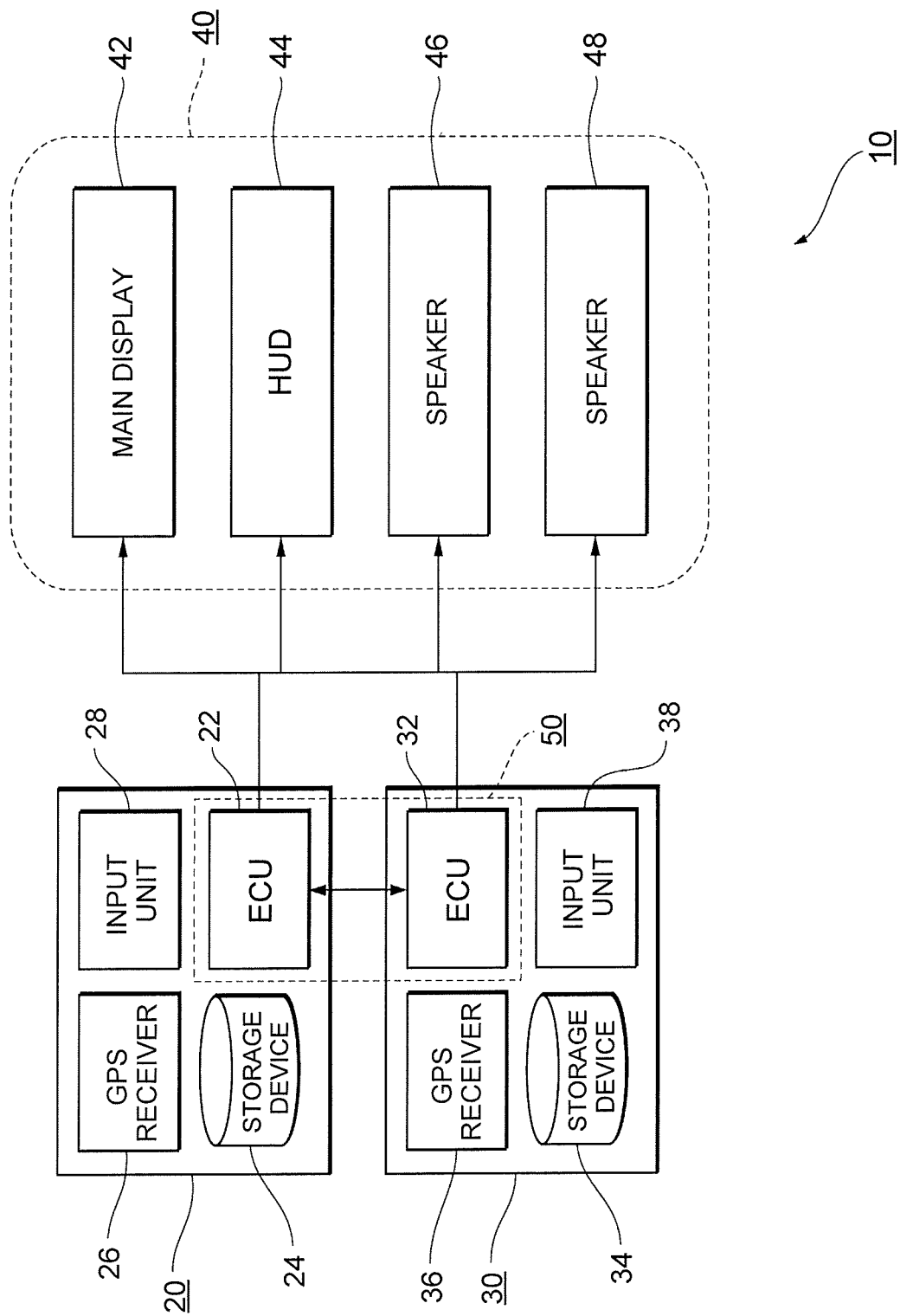
FIG. 1 is a block diagram of an in-vehicle system 10.

FIG. 1 shows a block diagram of an in-vehicle system 10 according to an embodiment. The in-vehicle system 10 includes a navigation device 20, an automatic driving device 30, and information output means 40.

An electronic control unit (ECU) 22 of the navigation device 20 and an ECU 32 of the automatic driving device 30 function as an information providing device 50 that outputs to an information output means 40 a control signal for outputting route guidance information based on the navigation device 20 and a control signal for outputting automatic driving guidance information based on the automatic driving device 30, respectively.

The navigation device 20 includes a storage device 24, a GPS receiver 26, an input unit 28, and the ECU 22. The navigation device 20 searches for a routes for reaching a destination that is input from the input unit 28, based on current location information received from the GPS receiver 26 and on map data stored in the storage device 24, and transmits to the information output means 40 a control signal for outputting route guidance information for traveling along the route. The control signal includes output setting information. Specifically, the output setting information includes a first setting for displaying the route guidance information as an image, a second setting for displaying the information as a text, a third setting for outputting the information as a voice, and a fourth setting for outputting the information as a sound effect. The output setting information includes information that specifies at least one setting out of the first to fourth settings.

The storage device 24 is configured of an information storage device such as a hard disk drive (HDD) or a solid state drive (SSD) that stores map data. The map data includes facility information, address information, and location information regarding specific points called nodes that include intersections of roads. The map data also includes information corresponding to so-called links that are roads connecting the nodes. The location information is indicated by latitude, longitude, and altitude, for example.

The GPS receiver 26 acquires location information regarding a vehicle by receiving signals from GPS Satellites. The location information is indicated by latitude, longitude, and altitude, for example.

The input unit 28 is means used by a driver or the like of the vehicle to input data such as a destination. For example, the input unit 28 is configured of a touch panel mounted on a main display 42. The input unit 28 may include a microphone for inputting data such as a destination uttered by the driver or the like.

The ECU 22 searches for a route from a place of departure, that is input from the input unit 28 or specified based on the location information received from the GPS receiver 26, to a destination with reference to the map data stored in the storage device 24, and records the set route information on an unshown cache memory or the like. The route information includes information on a plurality of links that connect nodes present between the place of departure and the destination.

The ECU 22 further transmits to the information output means 40 a control signal for outputting route guidance information for guiding a route to the destination, based on the current location information regarding the vehicle acquired with use of the GPS receiver 26 during traveling of the vehicle and on the set route information. As stated above, the control signal includes output setting information that enables prescribed output means to output route guidance information of a prescribed type. For example, the ECU 22 can transmit to the information output means 40 a control signal including output instruction information for displaying image information on the main display 42 while outputting voice from the speaker 46 at the same time.

The automatic driving device 30 includes a storage device 34, a GPS receiver 36, an input unit 38, and an ECU 32. The storage device 34, the GPS receiver 36, the input unit 38, and the ECU 32 are configured to be able to include the same functions as the storage device 24, the GPS receiver 26, the input unit 28, and the ECU 22 of the navigation device 20, respectively. Accordingly, a redundant description will be omitted.

Based on information acquired from in-vehicle sensors, including a laser imaging detection and ranging (LiDAR), a millimeter-wave radar, and an imaging device such as a camera, the ECU 32 recognizes peripheral environments, such as surrounding vehicles, pedestrians, white lines defining road lanes or the like, and traffic signals, that vary dynamically, and acquires vehicle location information and vehicle posture that are more accurate than the vehicle location information acquired by the GPS receiver 26 of the navigation device 20. The ECU 32 can also set a travel route plan (lane plan) including a lane change, based on the acquired peripheral environments and vehicle location information. The location information includes sets of information that identify the link where the vehicle is currently present, the lane where the vehicle is currently present, a relative position on the lane where the vehicle is currently present, and a three dimensional position where the vehicle is currently present, respectively.

Here, the route information set by the navigation device 20 is in a unit of a link that connects nodes such as intersections, whereas the route information set by the automatic driving device 30 includes information that identifies a plurality of lanes that may be present on a single link. The route information set by the automatic driving device 30 further includes route information in a unit called a path that is shorter than the link. Accordingly, the route information set by the automatic driving device 30 has a higher resolution than the route information set by the navigation device 20. While the route information set by the navigation device 20 is static in principle, the route information set by the automatic driving device 30 may dynamically change depending on the peripheral environments, such as other vehicles.

The ECU 32 transmits to the information output means 40 a control signal for outputting automatic driving guidance information for guiding route information based on a lane plan. The control signal includes output setting information that enables prescribed output means to output automatic driving guidance information of a prescribed type. For example, the ECU 32 can transmit to the information output means 40 a control signal including output setting information for displaying image information on the main display 42 while outputting voice from the speaker 46 at the same time.

The ECU 32 is further configured to be able to generate control data for controlling devices such as a steering gear, an accelerator, and a brake based on the set lane plan, and output the control data to each actuator.

The storage device 34 also store computer programs for executing a route planning algorithm for the lane plan and arithmetic processes shown in the respective flowcharts in the present disclosure. Each of the arithmetic processes can be implemented by executing these computer programs with the processor of the ECU 32 (for example, an arithmetic processing device made of a semiconductor integrated circuit such as an application specific integrated circuit) and hardware of a cache memory, such as a static random access memory (SRAM).

The automatic driving device 30 and the navigation device 20 may include a partially shared configuration. For example, the automatic driving device 30 and the navigation device 20 may be configured to be able to access a shared storage device where data such as map data is recorded. The ECU 32 and the ECU 22 are configured to be communicable with each other.

The information output means 40 includes the main display 42 and a head up display (HUD) 44 that can display an image and a text, and two speakers 46, 48 that can output a sound effect or voice by mechanized speech. The information output means 40 may further include a processor for controlling each of the devices (the main display 42, the HUD 44, the speaker 46, and the speaker 48) such that the devices perform prescribed output at prescribed timing based on the received control signals. The information output means 40 may further include a storage device that stores data (image data, voice data, and sound effect data) to be output, or means for generating the data to be output. The information output means 40 may be configured to read or generate, and output instructed data, based on the control signal received from the navigation device 20 or the automatic driving device 30, or may be configured to receive the data from the navigation device 20 or the automatic driving device 30 that reads or generates the data.

For example, in order to generate voice by mechanized speech, the information output means 40 may include a storage device and a processor. The storage device may be configured to store a voice database and a computer program for implementing a waveform concatenation-based or hidden markov model (HMM)-based speech synthesis technique. The processor may be configured to execute the computer program.

Figure 2:
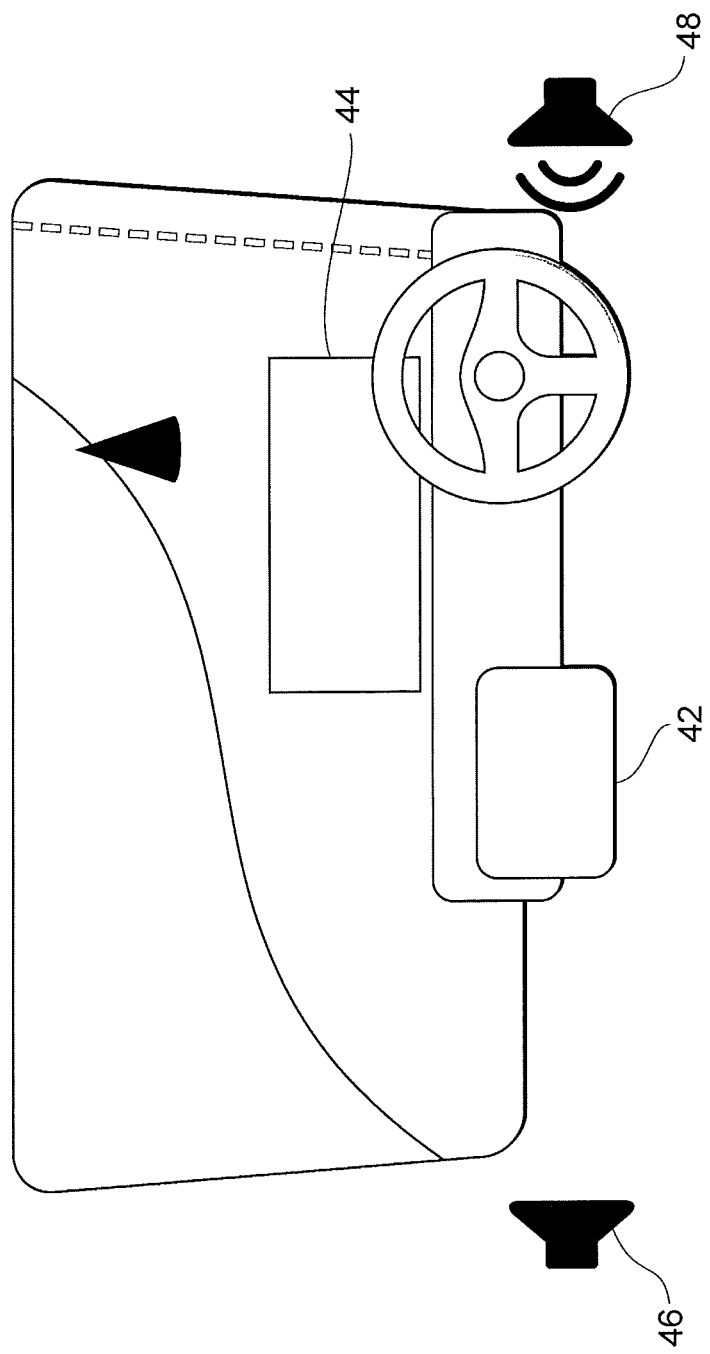
FIG. 2 is a schematic view of a vehicle incorporating output devices of information output means 40.

FIG. 2 shows an example where the information output means 40 is disposed inside a vehicle. The main display 42 is a display device made of a liquid crystal display installed on a dashboard. A driver and other passengers can view an image and a text displayed on the main display 42. The HUD 44 is a projection display device that makes a windshield glass reflect a video image projected from a source of projection and makes the driver visually recognize the video image as a virtual image. The speakers 46, 48 are installed on the left side and the right side in a travel direction of the vehicle, respectively.

Hereinafter, an output method of route guidance information according to the present embodiment, when a vehicle incorporating the automatic driving device 30 is automatically driven at an automatic driving level 2 will be described with reference to the flowchart shown in FIG. 3.

Here, description is given of examples of the automatic driving levels in automatic driving modes defined by National Highway Traffic Safety Administration (NHTSA) or other organizations.

Automatic driving level 1 is a driving mode where an automatic driving device can implement any one of a steering gear (steering), an accelerator (acceleration), and a brake (braking). The driver needs to operate the vehicle.

Automatic driving level 2 is a driving mode where the automatic driving device can simultaneously implement some of the steering gear, the accelerator, and the brake. In the automatic driving level 2, the automatic driving device controls the steering gear and vehicle speed based on the information acquired from the periphery of the vehicle (including a road surface and other vehicles) with use of various sensors mounted on the vehicle. The driver needs to operate the vehicle in case of emergency or the like.

Automatic driving level 3 is a driving mode where the automatic driving device can simultaneously implement all the operations of the steering gear, the accelerator, and the brake. The automatic driving device performs full automatic driving of the vehicle based on various information obtainable from sensors, communication means, or the like. The driver needs to operate the vehicle in case of emergency or the like.

Therefore, in the automatic driving level 2, it is desirable that the driver can operate the vehicle where necessary with assistance of route guidance based on the navigation function of the navigation device 20, while implementing automatic driving with the automatic driving device 30.

Figure 3:
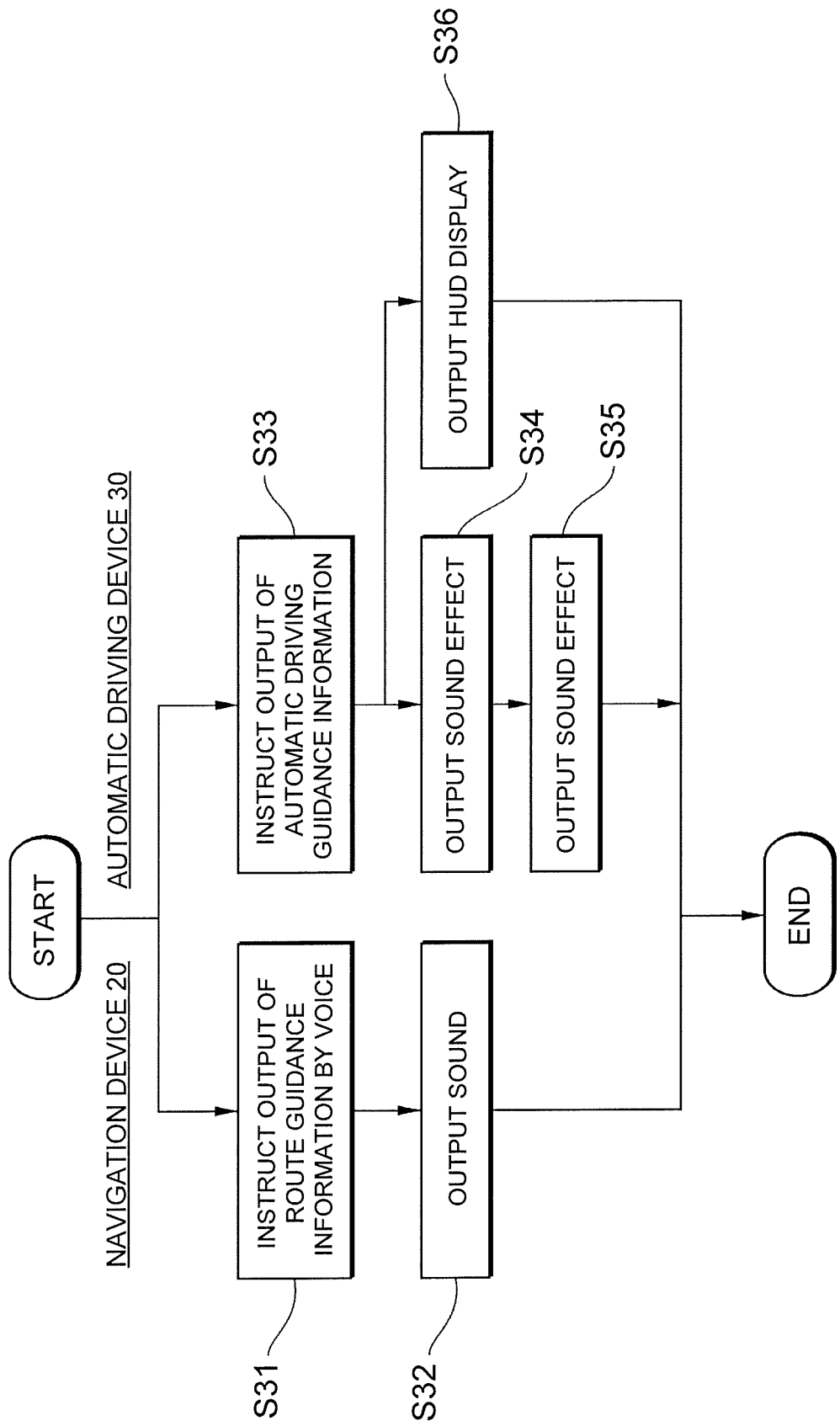
FIG. 3 is a flow chart showing an output method of a sound effect according to an embodiment.

In step S31 of FIG. 3, when the driver or the like inputs a place of departure and a destination using the input unit 28 of the navigation device 20 or based on the location information received from the GPS receiver 26, the ECU 22 of the navigation device 20 searches for a route constituted of links that connect the nodes present along the place of departure to the destination, and displays candidate routes on the main display 42 or the like. When the driver or the like specifies a prescribed route using the input unit 28, route information including the information on the links that connect the nodes present along the place of departure to the destination is stored in the storage device 24. The ECU 22 also starts output of a control signal for outputting route guidance information based on the specified route information to the information output means 40.

For example, when the vehicle approaches a point where route guidance is necessary, such as when the vehicle is to enter a left branch, the ECU 22 transmits to the information output means 40 a control signal including output setting information for outputting route guidance information by mechanized speech such as "enter the left branch road" from the speaker 46 and the speaker 48. The control signal may also include output setting information for displaying on the main display 42 and the HUD 44 an image for guiding the vehicle to the left branch as the route guidance information.

In step S32 of FIG. 3, the speaker 46 and the speaker 48 output voice by mechanized speech for guiding the route based on the received control signal. The main display 42 and HUD 44 also display an image corresponding to the route guidance information based on the received control signal.

In step S33, when the driver or the like starts automatic driving, the ECU 32 of the automatic driving device 30 starts automatic driving guidance based on a lane plan. For example, as shown in FIG. 2, when the vehicle approaches the point where it is preferable to provide guidance for automatic driving, such as the case where on a road having a plurality of lanes, the vehicle needs to make a lane change to a right lane because roadworks or the like are conducted in the lane where the vehicle currently travels, and the case where the vehicle needs to merge into the right lane because the lane where the vehicle currently travels ends, the ECU 32 transmits a control signal for outputting the automatic driving guidance information to the information output means 40.

The information providing device 50 according to the present embodiment is configured to output automatic driving guidance information for notifying the driver or the like about a change of the travel route based on the automatic driving device 30, or the like, by a sound effect. Since there are several methods for outputting the sound effect, each of the methods will be described below.

In one method, out of the left speaker 46, and the right speaker 48, only one speaker in the direction where the vehicle moves by automatic driving is controlled to output the sound effect, and the other speaker is controlled not to output the sound effect.

In step S33, the ECU 32 of the information providing device 50 transmits a control signal such that only the speaker in the moving direction outputs the sound effect. For example, when the vehicle is moved to the right lane, the ECU 32 transmits to the information output means 40 a control signal including output setting information indicating that the sound effect is output only from the speaker 48 installed on the right side in the travel direction of the vehicle, while the sound effect is not output from the speaker 46.

In step S34, the speaker 48 outputs the sound effect based on the received control signal. The sound effect may be set such that a prescribed electronic sound is repeatedly output during the time (for example, for several seconds) until a lane change is completed.

When the vehicle is moved to a left lane by automatic driving, the ECU 32 transmits to the information output means 40 a control signal including output setting information indicating that the sound effect is output only from the speaker 46.

In such configuration, the guidance based on the navigation device 20 is performed by mechanized speech, while the guidance based on the automatic driving device 30 is performed by the sound effect. This makes it possible to eliminate the necessity of the driver or the like to arbitrate the output timings of both the guidances. Moreover, even when both the guidance is output practically simultaneously or consecutively, it is possible to clearly and instantaneously distinguish both the outputs based only on the auditory sense. The sound effect is set to be output only from the right speaker 48 when the vehicle moves rightward, and the sound effect is set to be output only from the left speaker 46 when the vehicle moves leftward. This enables the driver or the like to recognize the moving direction as bodily sensation. Since output aspects of the sound effect from the two speakers 46 and speaker 48 are changed depending on the moving direction, the driver or the like can recognize the moving direction only by the sound effect.

A different sound effect indicating that a lane change is completed may be set to be output from at least one of the speaker 46 and the speaker 48 by adding step S35 to step S34 in an additional manner. For example, when a lane change is completed, the ECU 32 may transmit a control signal such that a prescribed sound effect is simultaneously output from the speaker 46 and the speaker 48 in step S35.

When the vehicle moves backward by automatic driving as in the case of parking, the sound effect may be output only from a speaker mounted on a rear seat side. When the sound effect is output from one speaker, the voice guidance based on the navigation device 20 may further be output from the other speaker simultaneously.

In the other method, both the left speaker 46 and the right speaker 48 output the sound effect at different timing.

In step S33, the ECU 32 of the information providing device 50 transmits a control signal such that the speaker in the moving direction of the vehicle outputs the sound effect immediately after the speaker in an opposite direction of the moving direction outputs the sound effect. For example, when the vehicle is moved to a right lane, the ECU 32 first outputs the sound effect from the left speaker 46 at first timing. The ECU 32 then outputs to the information output means 40 a control signal including the output setting information set to output the sound effect from the right speaker 48 at second timing immediately after the first timing (for example, in 500 milliseconds or less).

In that case, in step S34, the speaker 46 outputs the sound effect based on the received control signal, and in step S35, the speaker 48 outputs the sound effect based on the received control signal.

Also in such a method, the guidance based on the navigation device 20 is performed by mechanized speech, while the guidance based on the automatic driving device 30 is performed by the sound effect. This makes it possible to eliminate the necessity of the driver or the like to arbitrate the output timings. The driver or the like can distinguish both the guidance clearly and instantaneously based on only the auditory sense. Since the moving direction of the vehicle and the moving direction of the sound source of the sound effect coincide, it becomes possible to recognize the moving direction as bodily sensation.

Step S34 and step S35 may repeatedly be executed until a lane change is completed. In that case, a time interval between step S34 and step S35 is set to be shorter than a time interval until S34 is executed again after step S35 in order to easily grasp the moving direction.

The speaker disposed in the moving direction may have a sound volume larger than the sound volume of the speaker disposed in the opposite direction. The sound effect may also be output from the speaker mounted on the rear seat side. The sound effect output from the speaker in the moving direction may be different from the sound effect output from the speaker in the opposite direction.

In the two methods described above, in step S33, the ECU 32 may additionally transmit to the information output means 40 a control signal for displaying, with a meter or the like, an image representing the movement of the vehicle, with use of the HUD 44, as the automatic driving guidance information. In that case, in step S36, the HUD 44 displays an image representing a travel route by automatic driving based on the received control signal.

Figure 4:
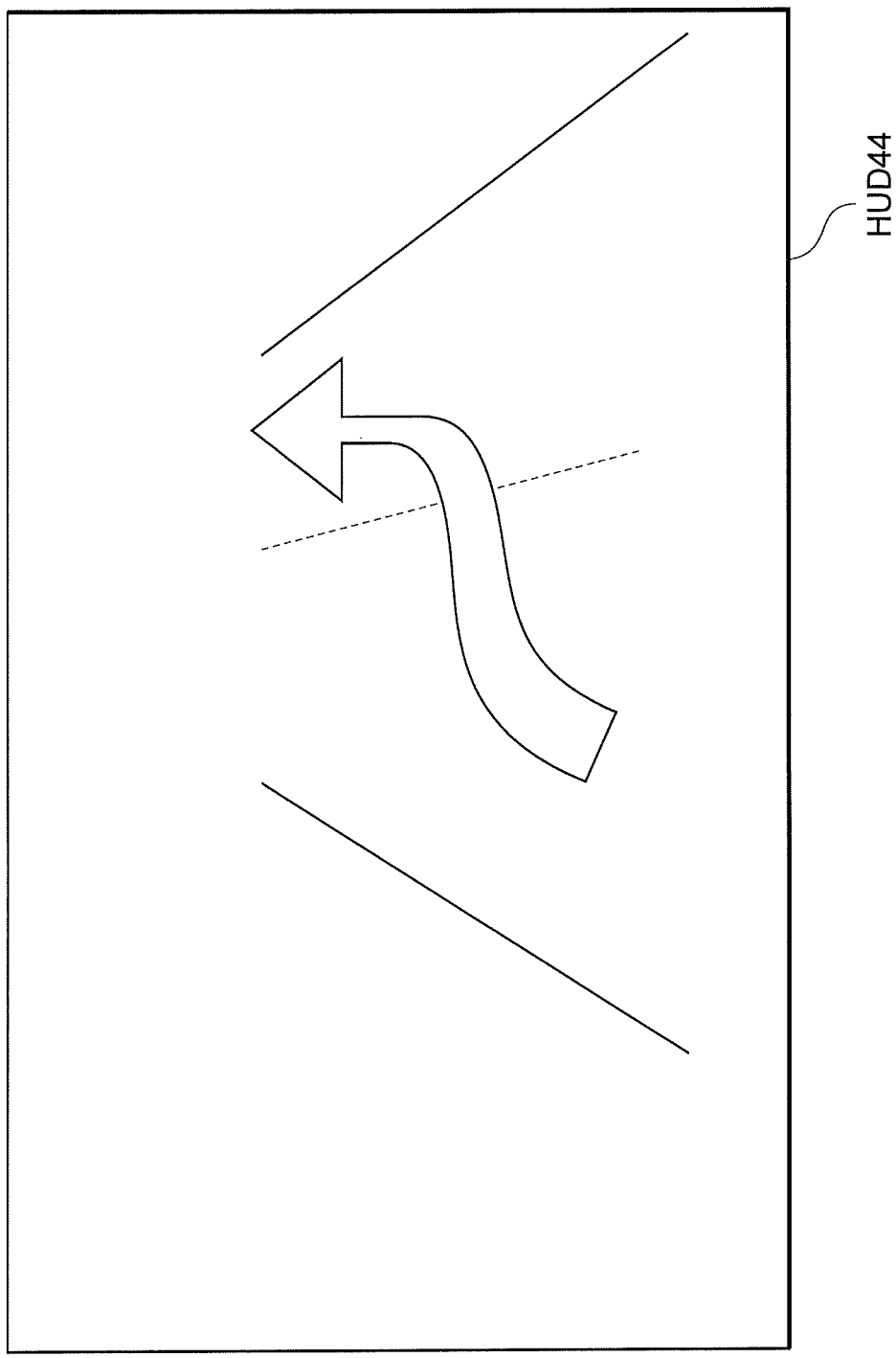
FIG. 4 is a schematic view of automatic driving guidance display by a head-up display (HUD) 44.

FIG. 4 is a schematic view showing an image of the vehicle moving to a right lane displayed with the HUD 44.

The guidance based on the navigation device 20 is performed by the mechanized speech, while the guidance based on the automatic driving device 30 is performed by displaying the image with the HUD 44. Accordingly, the driver or the like can grasp both the guidance, separately. At the same time, the sound effect that implies that the travel route is based on automatic driving is output from the speaker 46 or the speaker 48. This makes it possible to easily grasp the travel route by automatic driving.

A text or the like stating that the guidance is based on the automatic driving device 30 may additionally be displayed at the same time. Moreover, the main display 42 may display visual route guidance information based on the navigation device 20.

The information providing device 50 described in the foregoing enables the driver or the like to auditorily distinguish between the guidance of a travel route of the vehicle based on the navigation device 20 and the guidance of a travel route based on the automatic driving device 30, without arbitrating the output timing. Therefore, it is possible to reduce the difficulty of hearing the guidance and the possibility of misleading the driver or the like when both the guidance is output by voice.

Furthermore, in addition to simple output of the sound effect as stated above, changing the position and timing to output the sound effect, and the tone of the sound effect can impart a plurality of implications to the sound effect.

When the driver or the like does not use the navigation device 20, the automatic driving device 30 may perform automatic driving guidance by voice. In this case, the voice guidance by the navigation device 20 may be made by male voice, and the voice guidance by the automatic driving device 30 may be performed by female voice. Furthermore, the location of speech may be changed such that the voice guidance by the automatic driving device 30 may be output from a speaker installed on the ceiling of the vehicle. During the output of the voice guidance by the automatic driving device 30, a prescribed indicator may also be displayed on the HUD 44. The voice guidance by the automatic driving device 30 may be distinguished more accurately by expressing that the speaker of the speech is the automatic driving system.

The automatic driving guidance by the sound effect may be performed only in specific scenes. For example, the automatic driving guidance by the sound effect may be performed when the travel direction of the vehicle is changed with steering, such as the cases of a lane change, a left turn, and a right-turn. The automatic driving guidance that is less likely to compete with the route guidance by the navigation device 20 may be performed by voice. For example, since the information notifying the start of automatic driving has no possibility of competing with the route guidance by the navigation device 20, the information may be output by voice or by the sound effect different in tone, or enables the driver or the like to select one of these.

Furthermore, only when the route guidance by the navigation device 20 and the automatic driving guidance by the automatic driving device 30 are output at the same time (or within a prescribed time), the automatic driving guidance by the sound effect may be performed. When both the guidance is not output at the same time, the automatic driving guidance by voice may be performed. Since the ECU 22 and the ECU 32 are configured to be communicable with each other, the ECU 32 can receive a control signal output from the ECU 22, and determine whether the output timing by the information output means 40 based on the control signal coincides with the output timing by the information output means 40 based on an output signal transmitted by the ECU 32 itself. For the determination, various means can be adopted. For example, time information indicating the time of output by the information output means 40 may be added to the control signal, and when a time difference between both the output timings is within a prescribed time, the ECU 32 may be configured to determine that the output timings coincide. Alternatively, the ECU 32 may be configured to determine whether the output timings coincide by comparing a count value at the time when the route guidance by the ECU 32 becomes necessary with a prescribed threshold, with use of a counter that starts counting when the control signal is received from the ECU 22. The present disclosure is also applicable in the case of other automatic driving levels.

The above embodiment relates to the output methods of the sound effect when a lane change or other operations is executed by the automatic driving device 30. Hereinafter, description is given of the aspect of sound effect output in other scenes. The functions implementable with use of similar hardware and software configuration will be described with similar reference numerals to omit redundant description.

Figure 5:
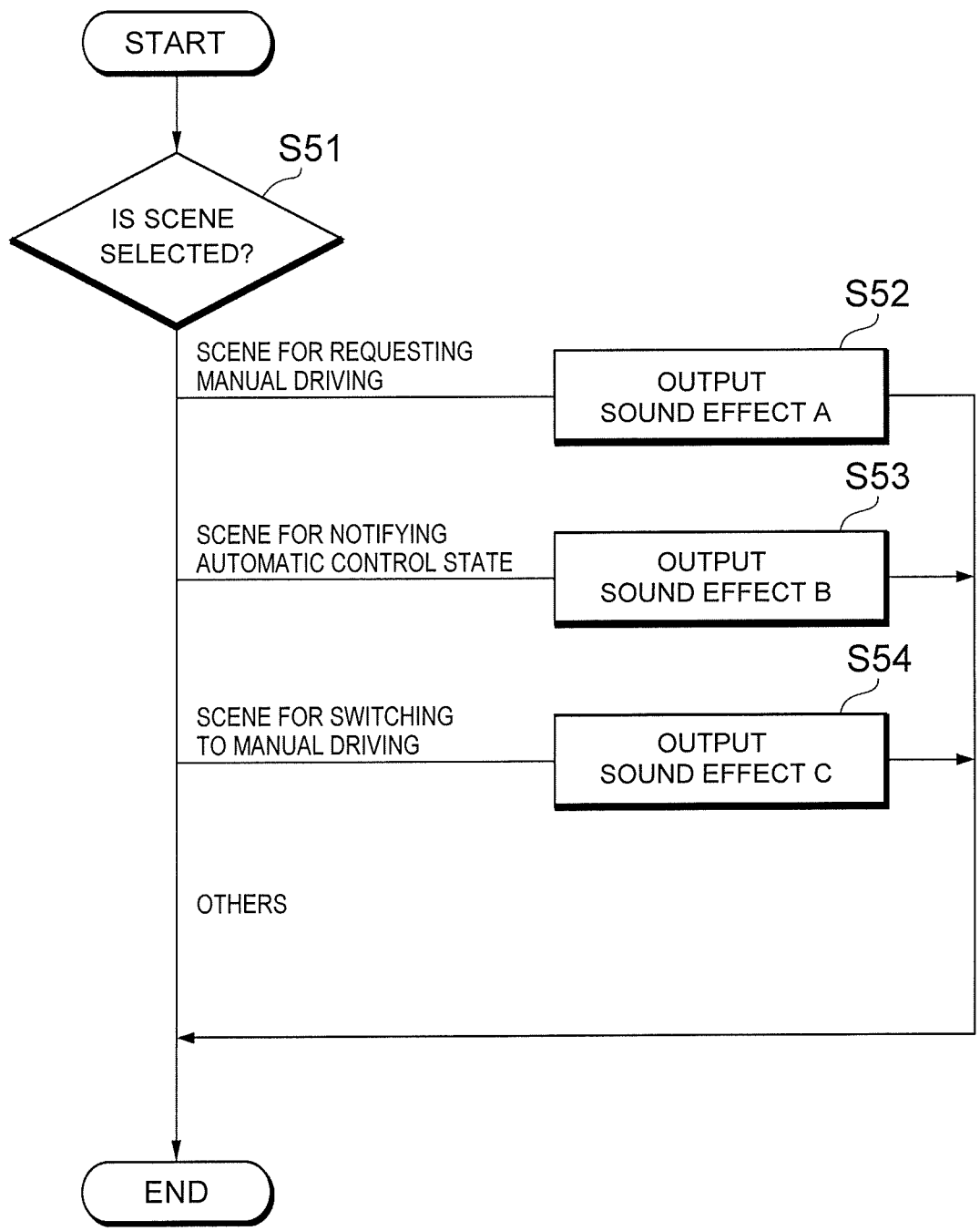
FIG. 5 is a flowchart showing an output method of a sound effect according to a modification.

FIG. 5 is a flowchart showing an output method of the sound effect according to a modification.

In step S51, the ECU 32 selects a scene for determining a sound effect to be output during automatic driving.

For example, when the ECU 32 determines in step S51 that it is the scene for requesting manual operation by a driver, the ECU 32 transmits, in step S52, a control signal for outputting a sound effect A to the information output means 40, and outputs the sound effect from the speaker 46 or the speaker 48. Since the scene for requesting manual operation is often relatively high in urgency, it is preferable to output the sound effect suitable for such a situation. For example, the ECU 32 may transmit to the information output means 40 a control signal for repeatedly outputting the sound effect of high sound with a relatively high frequency in a short cycle.

When the ECU 32 determines in step S51 that it is the scene for notifying the driver that the vehicle is in an automatic driving state, then in step S53, the ECU 32 transmits a control signal for outputting a sound effect B to the information output means 40, and outputs the sound effect B from the speaker 46 or the speaker 48. Since the scene for notifying the automatic driving state does not request manual operation to the driver, the scene is low in urgency. Accordingly, it is preferable to output the sound effect suitable for such a situation. For example, the ECU 32 may transmit to the information output means 40 a control signal for repeatedly outputting the sound effect of low sound with a relatively low volume and low frequency in a long cycle. Such a sound effect may constantly be output during automatic driving that does not request operation of the driver. The types of the sound effect may be changed depending on the automatic driving levels.

When the ECU 32 determines in step S51 that it is the scene for switching from automatic driving to manual driving, then in step S54, the ECU 32 transmits a control signal for outputting a sound effect C to the information output means 40, and outputs the sound effect C from the speaker 46 or the speaker 48. For example, when the driver squeezes the steering wheel, the ECU 32 may be configured to determine that it is the scene for switching from automatic driving to manual driving. Although such a scene is relatively not high in urgency, the sound effect for this scene may preferably have a sound volume high enough to awaken the driver who has left the driving operation to automatic driving till then. For example, the ECU 32 may transmit to the information output means 40 a control signal for outputting a sound effect having a louder sound volume than the sound effect B until the driver regains a fit state to drive. The ECU 32 can determine whether or not the driver is in the fit state to drive based on the force of the driver grabbing the steering wheel, information received from the image sensor that images a driver's expression, or the like.

The information providing device 50 as described in the foregoing can impart a plurality of implications to the sound effect by changing the tone (one of the attributes of sound relating to auditory sense: the attribute corresponding to a difference between two physically different sounds when the sounds sound like different sounds even though they have the same loudness and height) of the sound effect, in addition to the effects according to the above-stated embodiment. This saves the driver or the like from the labor of understanding what the voice says.

Various modifications of the present disclosure may be made without departing from the scope of the present disclosure. For example, some component members of a certain embodiment may be deleted, or be replaced by other component members within the range of general creativity of a person skilled in the art.

What is claimed is:

1. An information providing device to be mounted on a vehicle, the information providing device comprising:
    a controller configured to:
        transmit, when the vehicle is simultaneously controlled by an automatic driving function and a navigation function and in response to a determination that the automatic driving function conflicts with the navigation function, a first control signal for outputting route guidance information for informing a driver of the vehicle about a specified route by mechanical speech, and a second control signal for outputting automatic driving guidance information for informing the driver of the vehicle about a route of the vehicle driven by the automatic driving function by a sound effect.

2. The information providing device according to claim 1, wherein when the specified route is different from the route of the vehicle driven by the automatic driving function, the controller is configured to transmit the second control signal for outputting the sound effect.

3. The information providing device according to claim 1, wherein:
    the vehicle includes a first speaker installed on a right side in a travel direction, and a second speaker installed on a left side in the travel direction; and
    the controller is configured to transmit the second control signal so as to output, when the vehicle moves rightward by the automatic driving, the sound effect at least from one of the first speaker and the second speaker in a first aspect, and output, when the vehicle moves leftward by the automatic driving function, the sound effect at least from one of the first speaker and the second speaker in a second aspect different from the first aspect.

4. The information providing device according to claim 1, wherein the controller is further configured to:
    transmit, when the vehicle is controlled by the automatic driving function and not controlled by the navigation function, a third control signal for outputting the automatic driving guidance information for informing the driver of the vehicle about the route of the vehicle driven by the automatic driving function by the mechanical speech.

5. The information providing device according to claim 1, wherein the controller is further configured to:
    transmit, when the vehicle simultaneously controlled by an automatic driving function and a navigation function and in response to a determination that the automatic driving function does not conflict with the navigation function, the second control signal for outputting automatic driving guidance information for informing the driver of the vehicle about a route of the vehicle driven by the automatic driving function by the mechanical speech.

6. The information providing device according to claim 1, wherein the automatic driving function is determined to conflict with the navigation function when the route guidance information and the automatic driving guidance information are output at a same time or within a predetermined time interval.

7. An in-vehicle device comprising:
    a car navigation device that provides a navigation function, the car navigation device including:
        an input unit for inputting a place of departure and a destination,
        a search unit for a route from the input place of departure to the destination, and
        a first controller for generating, based on the route and a current location, a first control signal for outputting route guidance information for informing a driver of a vehicle about a route to travel; and
    an automatic driving device the provides an automatic driving function, the automatic driving device including:
        a second controller for generating a second control signal for automatically driving the vehicle and a third control signal for outputting automatic driving guidance information for informing the driver of the vehicle about a route where the vehicle travels by the automatic driving, wherein
    when the vehicle is simultaneously controlled by the navigation function and the automatic driving function, and in response to a determination that an output of the first control signal conflicts with an output of the third control signal, the first controller generates the first control signal for outputting the route guidance information by mechanical speech, and the second controller generates the third control signal for outputting the automatic driving guidance information by a sound effect.

* * * * *